Sept. 29, 1942.   E. BISEO   2,297,387

OPTICAL INDICATOR FOR ROAD SIGNALING

Filed Feb. 17, 1940   3 Sheets-Sheet 1

INVENTOR:
EMANUELE BISEO
BY Haseltine, Lake & Co.
ATTORNEYS

Sept. 29, 1942.　　　　E. BISEO　　　　2,297,387
OPTICAL INDICATOR FOR ROAD SIGNALING
Filed Feb. 17, 1940　　　3 Sheets-Sheet 2

INVENTOR:
EMANUELE BISEO
BY Haseltine, Lake & Co.
ATTORNEYS

Patented Sept. 29, 1942

2,297,387

UNITED STATES PATENT OFFICE 2,297,387

OPTICAL INDICATOR FOR ROAD SIGNALING

Emanuele Biseo, Rome, Italy; vested in the Alien Property Custodian

Application February 17, 1940, Serial No. 319,384
In Italy March 30, 1939

3 Claims. (Cl. 88—78)

The present invention has for its object an optical luminous indicator which serves to deviate, according to a pre-established angle, the rays from a source of light projected thereon and to signal towards other directions the presence of said source of light and the direction from which it originates.

The indicator consists of a platform, small column, or the like, preferably of a polygonal shape, made of any appropriate material, each of whose external walls shows one or more openings placed eventually one above the other, like windows which may or may not be fitted with common, or refracting, or diffusing panes of tempered crystal, or of other appropriate materials eventually encased in the walls towards the interior. Vertical partitions, separated by a horizontal partition or diaphragm, are placed inside following the diagonals of the indicator. The walls of the partitions may be of any appropriate material.

Owing to the position given to the vertical partitions a luminous ray coming from outside on to a wall of the indicator, passing through the openings of the said wall, will be deviated by the respective partitions towards the left and towards the right and, through the corresponding openings, it will be reflected outwards and thus be signaled to whomsoever finds himself on the side of the said openings.

In a variation of construction the vertical partitions of the indicator have a parabolic shape and are placed so as to enclose vertical portions of the external walls. Provision is made also for the openings or windows of each wall to be placed side by side instead of being superposed.

The indicator, according to the invention, finds particular employment in the regulating of road and motor traffic, especially at crossings. The invention may be usefully employed also in connection with railway lines, for military purposes, and in all cases in which it might be opportune to cause a variation in the direction of a light beam.

In the annexed drawings, given only by way of example without limitation, there are illustrated certain forms of embodiment of the invention.

Figure 1:
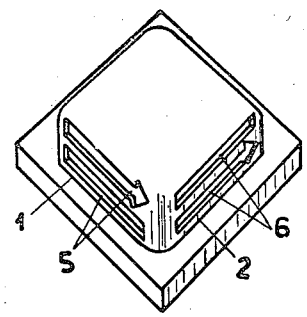
Fig. 1 represents a first form of embodiment.

With reference to the said drawings, the indicator is shown to be made of an external casing with plane vertical walls 1, 2, 3, 4; each wall is fitted with two windows 5, 6, 7, 8 placed one above the other. A transversal horizontal partition 9 divides the interior of the indicator into two spaces one above the other, each of which has a series of windows. Two vertical partitions 10, 11, placed according to the two diagonals, divide the two spaces respectively into two parts and form between each other an angle of 90°.

Thus, partition 10 separates lower windows 5 and 6 from the other two lower windows 7 and 8. Similarly, partition 11 separates top windows 6 and 7 from the windows 5 and 8. Vertical partitions 10 and 11 and transversal partition 9 will be advantageously made of reflecting material, or of material rendered so, such as for instance plated crystal and bright metal. If wood, or other material, is used, it can be painted white or another appropriate colour.

The windows may be fitted with common or diffusing panes of tempered crystal, or of other appropriate material, on which can be represented figures or conventional signs, which, while invisible in the dark, will be illuminated by the passing of a luminous ray, for instance by the sudden lighting of the head lamps of a motor vehicle, thus signaling the direction in which the said vehicle is running.

If, however, the indicator is to be used only for projecting a light beam in a direction different from that from which it comes, it might be useful to eliminate the window panes, while the two partitions 10 and 11, coloured in the desired colour, will project the light in other directions and in that certain colour.

Figure 4:
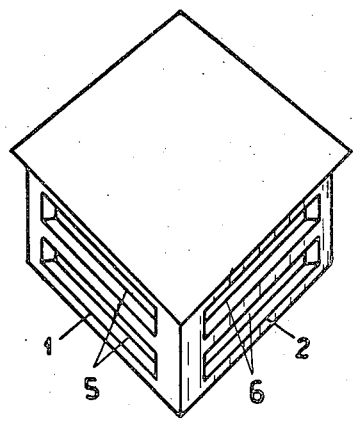
Fig. 4 represents a second form of embodiment of the invention.
Figure 5:
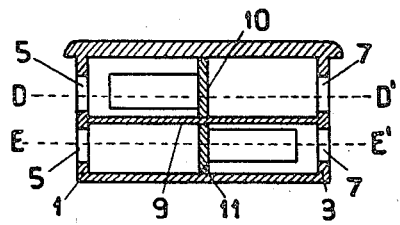
Fig. 5 is a vertical transversal section of one of the forms of embodiment represented in Figures 1, 2, 3.
Figure 8:
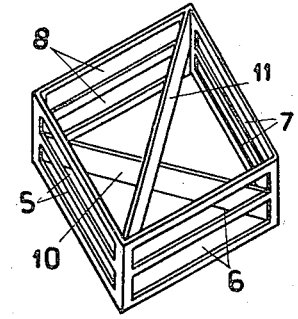
Fig. 8 is a perspective view of Figures 1 and 5 showing the interior.
Figure 6:
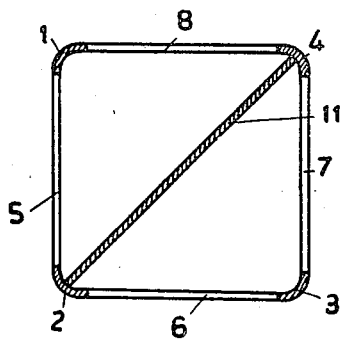
Fig. 6 is a section along line D—D' of Fig. 5.
Figure 9:
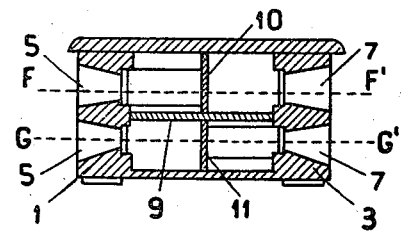
Fig. 9 is a transversal section of the form of embodiment represented in Fig. 4.
Figure 7:
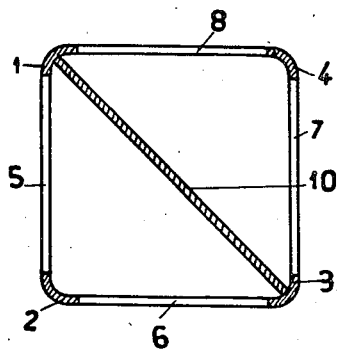
Fig. 7 is a section along line E—E' of Fig. 5.
Figure 10:
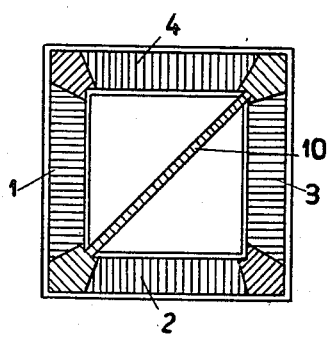
Fig. 10 is a section along line F—F' of Fig. 9.
Figure 11:
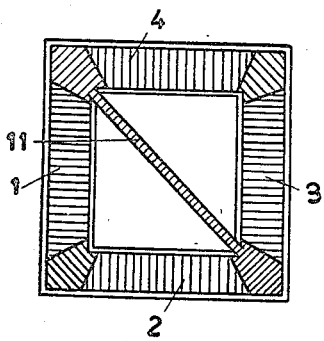
Fig. 11 is a section along line G—G' of Fig. 9.
Figure 12:
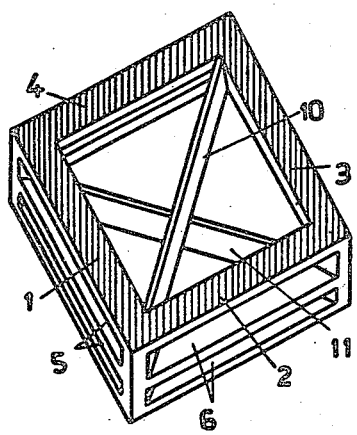
Fig. 12 is a perspective view of Figures 4 and 9 showing the interior.

In the form of embodiment of the invention illustrated in Fig. 4 the windows 5, 6, 7, 8 are fitted into the walls of the casing of the indicator.

Figure 3:
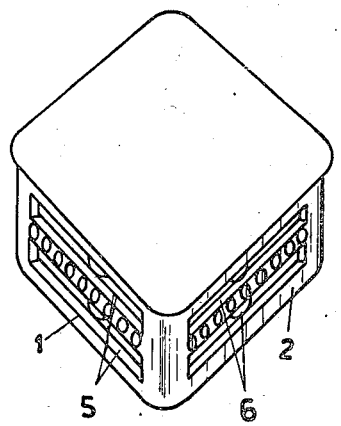
Fig. 3 is another variation of the said first form of embodiment.
Figure 2:
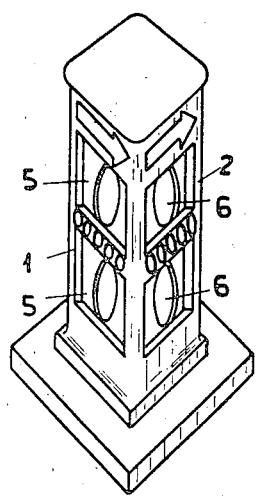
Fig. 2 is a variation of the said first form of embodiment.

This offers an appreciable advantage over the form of embodiment illustrated in Figures 1, 2, 3, in which the panes are on the same plane as the side walls. The advantage is evident, in as much as the light beam entirely illuminating one of the walls of the indicator and extending beyond it, the windows provided in the two lateral or normal walls are not struck by the direct light and remain protected by the shade projected by the walls. Furthermore, the figures or the writing or other signs drawn on the windows of the indicator remain more clearly visible.

Figure 13:
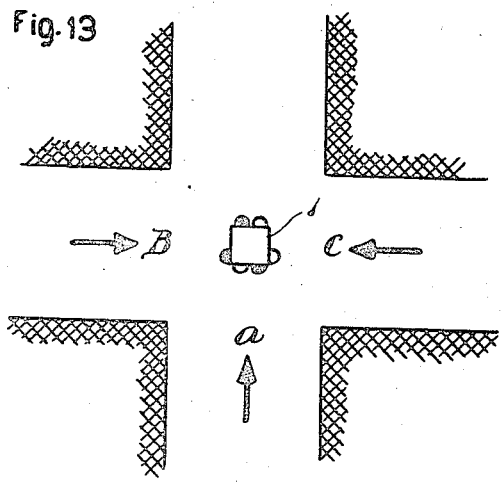
Fig. 13 is a scheme of working of the indicator used for regulating traffic.

The working of the indicator, in its more common embodiment for regulating road or motor traffic, is as follows:

A motor vehicle coming for instance from the direction of A (Fig. 13) on approaching the crossing will make the usual signals reducing alternately the luminous intensity of its head lamps. By doing so it will illuminate alternately the indicator which will cause the light beam to deviate in the two directions of B and of C. In consequence of the arrangement of partitions 10 and 11 and of transversal partition 9, in the directions of B and of C there will be illuminated only the upper and respectively the lower window. Thus, supposing for instance that there are represented on the panes certain conventional signs to indicate the direction in which the vehicles are running, B and C will know exactly the direction of vehicle A. At the same time A is warned of the approach of B and C. each of which will illuminate one of the windows of the wall of the indicator facing A. Such luminous signals will be noticed on the indicator by each of the motor vehicles in the intervals in which it does not illuminate the corresponding indicator wall and, therefore, the same will act in accordance with existing rules, giving way or only reducing speed.

As stated already, the preceding illustration is given only by way of example. It is obvious, therefore, that the indicator described may undergo all those variations of constructions which may be necessary for the various uses to which it may be applied, without departing from the principle of the invention.

What I claim and desire to secure by Letters Patent is:

1. An optical indicator for road signaling having a plurality of optical signals at different vertical levels, each signal being visible from at least two directions mutually disposed at an angle with each other the combination of a casing having a polygonal form with a side facing each direction from which the signals are to be observed, separate windows disposed at the different levels in the sides of said casing individually associated with and exposing each signal to view from without the casing, fixed means at each level for reflecting the light entering said windows into a different direction for each level, and a substantial horizontal partition or diaphragm disposed within the casing between the signals and windows of one level and those of another level so as to subdivide the interior of said casing into superposed separate spaces having a window upon each side.

2. An optical indicator for road signaling having a plurality of optical signals at different vertical levels, each signal being visible from at least two directions mutually disposed at an angle with each other the combination of a casing having a polygonal form with a side facing each direction from which the signals are to be observed, separate windows disposed at the different levels in the sides of said casing individually associated with and exposing each signal to view from without the casing, fixed means at each level for reflecting the light entering said windows into a different direction for each level, and a substantial horizontal partition or diaphragm disposed within the casing between the signals and windows of one level and those of another level so as to subdivide the interior of said casing into superposed separate spaces having a window upon each side, and wherein the signals include fixed reflecting members disposed at an inclined angle within each window or diagonally of the casing, one reflecting member being disposed at one level in partly rotated relation to another reflecting member disposed at another level.

3. An optical indicator for road signaling having a plurality of optical signals at different vertical levels, each signal being visible from at least two directions mutually disposed at an angle with each other the combination of a casing having a polygonal form with a side facing each direction from which the signals are to be observed, separate windows disposed at the different levels in the sides of said casing individually associated with and exposing each signal to view from without the casing, fixed means at each level for reflecting the light entering said windows into a different direction for each level, and a substantial horizontal partition or diaphragm disposed within the casing between the signals and windows of one level and those of another level so as to subdivide the interior of said casing into superposed separate spaces having a window upon each side, and said indicator having a pane of light transmitting material deeply set in each window so as to be encased in the walls of the casing and thereby protected from direct rays of light by the cone of shadows formed by said walls.

EMANUELE BISEO.